April 8, 1930.    A. DINA    1,753,647

FRAMING LIGHT MECHANISM

Filed Dec. 12, 1928    3 Sheets-Sheet 1

Inventor
Augusto Dina
By his Attorney

April 8, 1930. A. DINA 1,753,647
FRAMING LIGHT MECHANISM
Filed Dec. 12, 1928 3 Sheets-Sheet 2

Inventor
Augusto Dina
By his Attorney
Howard W. Dix

April 8, 1930.     A. DINA     1,753,647

FRAMING LIGHT MECHANISM

Filed Dec. 12, 1928     3 Sheets-Sheet 3

Inventor
Augusto Dina
By his Attorney
Howard W. Dix

Patented Apr. 8, 1930

1,753,647

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

FRAMING-LIGHT MECHANISM

Application filed December 12, 1928. Serial No. 325,564.

This invention relates to motion picture projecting machines and in particular it relates to a new means for accomplishing the operation of properly positioning the film in the machine in order to obtain correct projection. The operation of positioning the film is usually termed "framing".

By those persons familiar with the details of projection work, it is well known that the film must be properly positioned in the head of the projecting machine before starting, so that as the "change over" is made the theatre patron will not be aware of the work being done in the projection room. By the term "change over", it is understood that one projection machine is closed down when the supply of film therein has been exhausted and another machine, with a full supply of film, is started. It will be appreciated that the film in the newly started machine must be properly positioned therein or the theatre patron will be aware of poor projection operations when this new film is first projected on the screen. Thus it will be seen that it is important to have the framing operations properly and carefully completed in order to eliminate adverse comments being made by the theatre patrons.

The framing operation is accomplished by throwing a light of relatively low intensity on to the film and then adjusting the film so that one of the sections thereof, or exposures, registers properly and accurately with a definite sized opening formed in the projection machine. This opening is usually termed the aperture. The light required to accomplish this framing operation need only be of such intensity as to outline a section or exposure in the film. If the light is of too great intensity the film will be set on fire thereby causing great damage and endangering the lives of all of the people in the theatre. By reason of this great fire risk, the projecting light of the machine is not supposed to be used to accomplish the framing operation, but in actual practice it is found that the operator will risk using the projecting light. It is well known that the projecting light is of very high intensity and that a non-moving film becomes ignited when only a portion of the projecting light is thrown on to it. Thus it will be seen that a low intensity framing light is highly advantageous and eliminates a very dangerous fire risk.

It is the main object of my invention to provide an efficient low intensity light for accomplishing the framing operation in a motion picture projecting machine and to so locate this light that the convenience in performing the framing operation is greater than has heretofore been provided.

It is also an object of my invention to provide an improved lighting means for accomplishing the framing operation and to have this lighting means so constructed and arranged as to automatically be brought into operative position each time the projection machine is stopped and to be moved out of operative position when the machine starts.

A further object of this invention is to provide, at a very low cost of production and operation, a suitable framing light that is always ready for use without requiring special operations or movements on the part of the operator.

One of the particular objects of my invention is to so associate with the fire shutter of a motion picture projecting machine a suitable lighting means of sufficient intensity to permit proper framing of the film in the machine and at the same time eliminate any fire risk.

Another object of my invention is to provide an improved construction of certain parts of a projecting machine whereby the framing operation may be accomplished without removing the fire shutter from its normal closed position when the projection machine is not in operation.

Other objects and advantages of my invention will become more apparent as a reading is made of the detailed description set forth below.

In the accompanying drawings I have illustrated preferred constructions embodying my invention and in these drawings Fig. 1 is a plan view of a portion of a motion picture projecting machine showing a fire shutter properly mounted in such a machine;

It may be stated in a general manner, which includes the broad aspect of my invention, that I have provided in a motion picture projection machine suitable means for completing the framing operation without requiring a movement of the fire shutter from its closed position. Further, that one of the ways or methods of accomplishing this result is to have a light-giving or luminous means associated in some manner with the fire shutter so that the film is sufficiently illuminated when the fire shutter is in its down or closed position to allow the framing operation to be readily completed. The lighting means as herein referred to is considered as being such that a sufficient number of rays of light will be cast on to the whole or portions of the film adjacent the projection aperture so that the film may be properly positioned in registry with the aperture. It also may be stated that it is highly important that the top and bottom edges of the aperture opening should be illuminated to a sufficient extent or amount so that a section or exposure of the film may be properly brought into registry with the opening. It is well known in the motion picture industry that the film which passes through the projection machine is divided into sections or exposures and that dark or black lines extend across the film to indicate the top and bottom boundary of each section or exposure. In order to properly frame the film, or in other words, to properly register one of these exposures with the aperture opening, it requires that the black or dividing lines in the film shall be brought into alignment with the top and bottom edges of the aperture opening, therefore, it will be seen that it is highly desirable to illuminate the top and bottom edges of the aperture opening so that framing may be properly and accurately accomplished.

It will, therefore, be seen that my invention in its broad aspect deals with the proper framing of the film in the machine without moving the fire shutter, thereby eliminating any fire risk due to the projection light being able to reach the film until the machine is started.

Figure 1:
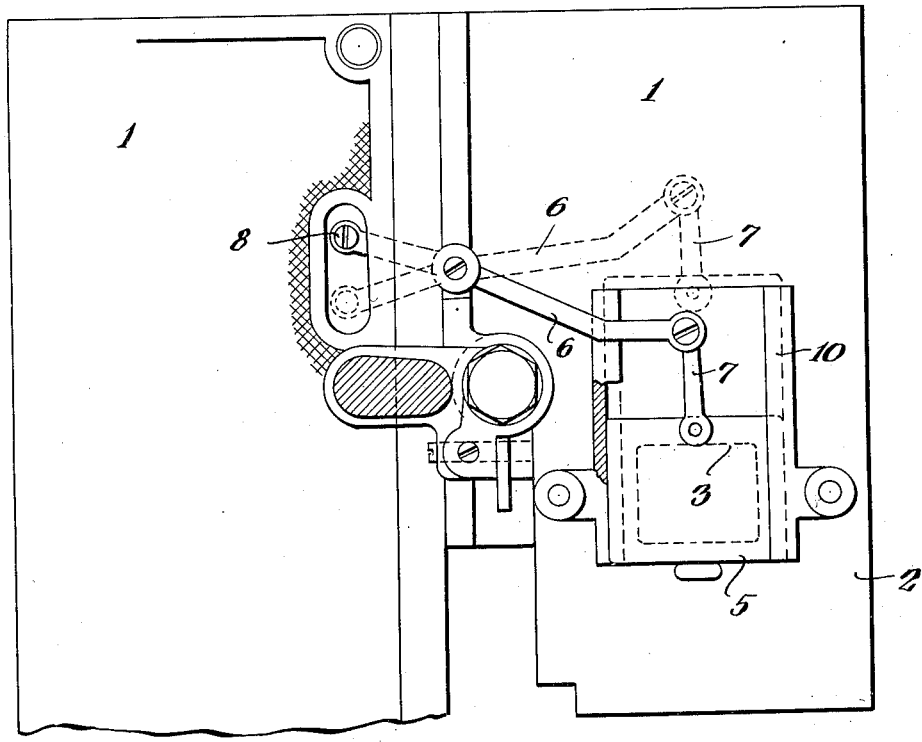
Figure 2:
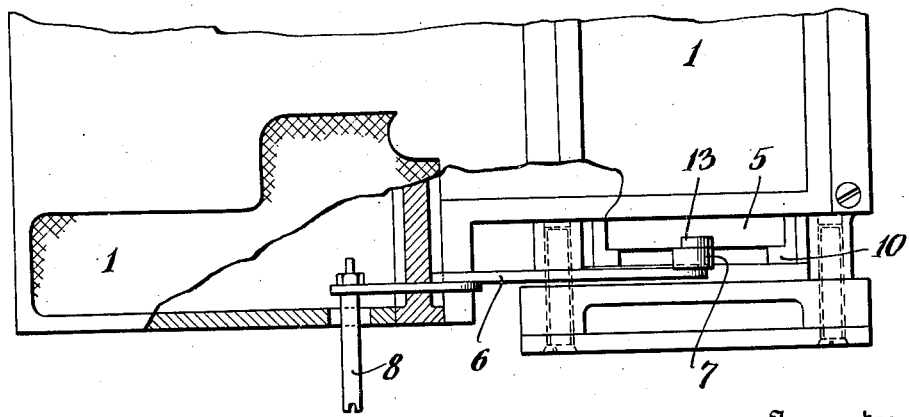
Fig. 2 is a top plan view of that portion of the motion picture projecting machine which has to do with the fire shutter construction and mounting.

Referring now to the drawings, I have shown in Figs. 1 and 2 one type of fire shutter for covering a projection aperture. In these drawings a portion 1 of a projection machine is shown as being a part of the head of such a machine. A wall 2 of this head is provided with an aperture opening 3 which permits light from the projecting lamp of the machine to pass to film 4 that is threaded through the machine. As is usual, a suitable fire shutter 5 is provided to close over this aperture when the machine is not running and to be automatically raised when the machine is running or operating. In this particular type of motion picture projection machine the shutter 5 is raised or lowered by means of a rocker arm 6 and a link 7 which joins the fire shutter 5 to the arm 6. At the free end of this link 6 there is provided a suitable pin 8 which extends through the back of the machine as will be noted from Fig. 2 and is employed by the operator to raise the fire shutter at any time he desires. In projecting machine constructions heretofore devised, it becomes necessary that the operator move this pin 8 to raise the fire shutter 5 in order to accomplish the framing operation.

It will be noted from the foregoing description that the main object of my invention is to complete the operation of framing the film in the machine without requiring the fire shutter to be raised. In the usual operation of a machine the fire shutter is automatically operated so that it is raised when the machine is in operation thereby permitting the beam of light from the projection lamp to pass to the film and from there to the screen, and when the machine is closed down the fire shutter automatically drops to its down or closed position. While I have shown this type of fire shutter as being slidable in a frame 10 there are other constructions of shutters which are pivoted at the top and are oscillated about their pivot to uncover the aperture 3 to thereby permit the proper operation of the projection machine. My invention as herein outlined is applicable to such pivot type of fire shutters.

Figure 3:
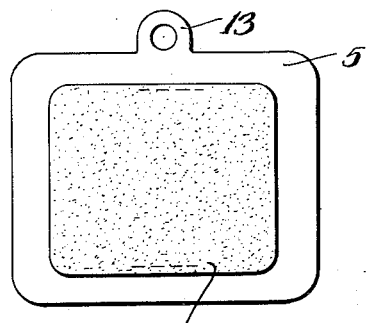
Fig. 3 is a plan view of a fire shutter showing one surface thereof provided with an illuminating means.
Figure 5:
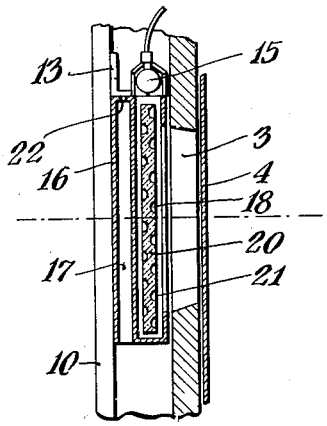
Fig. 5 is another sectional view of a fire shutter having associated therewith a light giving means.
Figure 6:
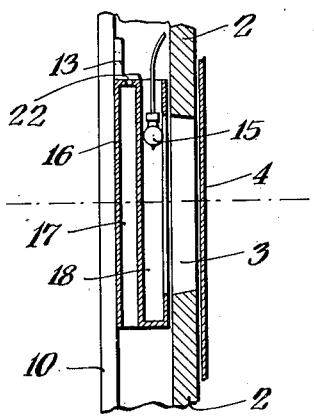
Fig. 6 is a modified form of the showing in Fig. 5.
Figure 7:
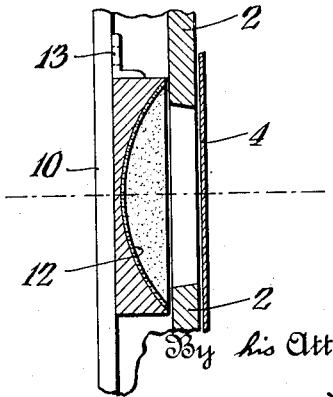
Fig. 7 is a sectional view showing a fire shutter of different construction than the one illustrated in Fig. 3.

Referring now to Figs. 3 to 7 inclusive I have illustrated one or more forms of modified fire shutters which may have associated therewith suitable lighting means to accomplish the illumination of the aperture opening and the film positioned adjacent thereto for framing purposes. In Fig. 3 I have shown the inner surface of the aperture plate 5 as being provided with some material 11 which will give sufficient light to the film which, it will be noted, is positioned only a short distance from the fire shutter, and thus permit satisfactory framing of the film. In this instance, I have employed a suitable radium paint or luminous white enamel. I desire to be understood broadly that I wish to associate together a fire shutter and a light giving means so that rays of light will be cast, or reflected when a small lamp or other light source is employed, upon the film 4 as positioned adjacent the aperture 3 and to have this condition exist automatically when the machine is brought to its stopped position or condition. As already illustrated in Fig. 3, I have accomplished this purpose by means of a luminous material which is associated with the fire shutter 5 by being attached thereto. In Fig. 7 I have shown a different construction of fire shutter and have provided a parabolic curved surface 12 for the reception of a light giving or reflecting material. It will be noted that by reason of this construction that more of the luminous material will be associated with the fire shutter than with the flat construction as shown in Fig. 3 due to the area of the curved surface. In addition there will be considerable reflection of the light rays which will also add to the amount of light passing to the film. It will be noted that in each of the fire shutters illustrated in Figs. 3 to 7 inclusive that an attached eye 13 is provided so that the shutter may be readily joined to link 7.

Figure 4:
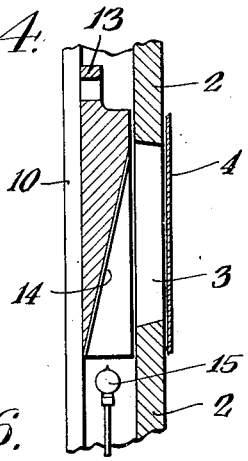
Fig. 4 is a view partially in section of a particular type of fire shutter, a portion of the projecting machine and a film, all assembled in normal operative positions.

In Fig. 4 I have illustrated another type of fire shutter construction and have provided on the inner side of the shutter a suitable bevelled light reflecting surface 14 which may be in the form of a polished metallic surface, or a surface coated with luminous white paint or enamel. This surface co-operates with a suitable light 15 to reflect light rays through the aperture 3 on to the film 4. The bevelled surface 14 is easily provided in a shutter at a small or negligible cost and a small electric light 15 of low intensity is readily positioned or held in relation to the side or wall 2 of the projection machine. It will, from this construction, be noted that the fire shutter is associated with the lamp 15 to illuminate the film 4 when the fire shutter is in its closed or down position and that the shutter and this lighting means automatically become effective to illuminate the film when the machine is in non-running position.

It will be understood that the bevelled surface 14 may be inclined in the opposite direction and the lamp 15 positioned above or attached to the top edge of the fire shutter. Such construction may be employed if desired and it is considered that such construction of the fire shutter is to be included within the scope of my invention as herein disclosed.

In Figs. 5 and 6 I have shown a modified form of fire shutter wherein I have provided a sheet metal stamping 16 bent into S shape and closed somewhat together to make it as narrow as conveniently possible and to form cavities 17 and 18. In the cavity 18 I have placed a suitable glass 20 which is provided with indentations 21 of any suitable nature and have located the lamp 15 above the glass 20 so that the light rays therefrom will pass down into the glass as is well understood from the laws of physics and by reason of the indentations 21 the light rays will be refracted and cast on the film 4 as positioned adjacent the aperture 3. Thus I have obtained a proper illumination of the film 4 by refraction and have also positioned the lamp 15 so that it will not have direct relation or position to the film 4 or the aperture 3. The cavity 17 formed in this particular type of fire shutter 16 forms an air insulating pocket so that heat developed in case the projecting lamp of the machine is thrown on to the shutter will not affect the glass or film. This heat insulation is replaced by new and cold air by reason of providing suitable openings 22 in the top of this cavity, thus permitting the hot air to pass out of the shutter. It will also be understood that the sides of the cavity 17 are open. Thus I have provided a construction which protects the glass that is used for refraction in throwing the light rays from lamp 15 on to the film 4. It will be understood that instead of using the glass 20, that suitable metal reflecting surfaces may be properly positioned within the cavity 18 to accomplish the same result.

In Fig. 6 I have illustrated the lamp 15 as positioned within the cavity 18 so that the rays of light emanating from the lamp may pass directly to the film 4. The lamp construction may be of the long longitudinal type instead of the round type as illustrated, if desired. Any low intensity lamp may be positioned in this fire shutter 16 so that there will be no danger from heat developed by the lamp being sufficient to ignite the film 4. If desired, protecting means such as glass or other transparent material may be positioned between the lamp and the film 4. It will be understood that such means will be moved when the fire shutter is automatically moved.

Figure 8:
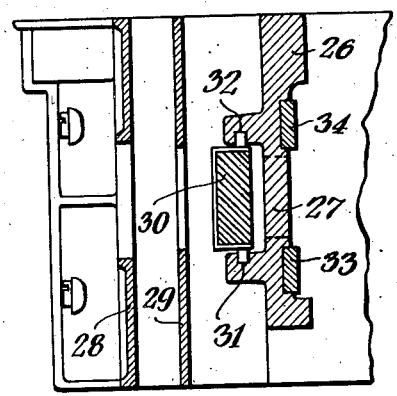
Fig. 8 is a horizontal sectional view of a still further modification of the invention taken on the line 8—8 of Fig. 10.
Figure 9:
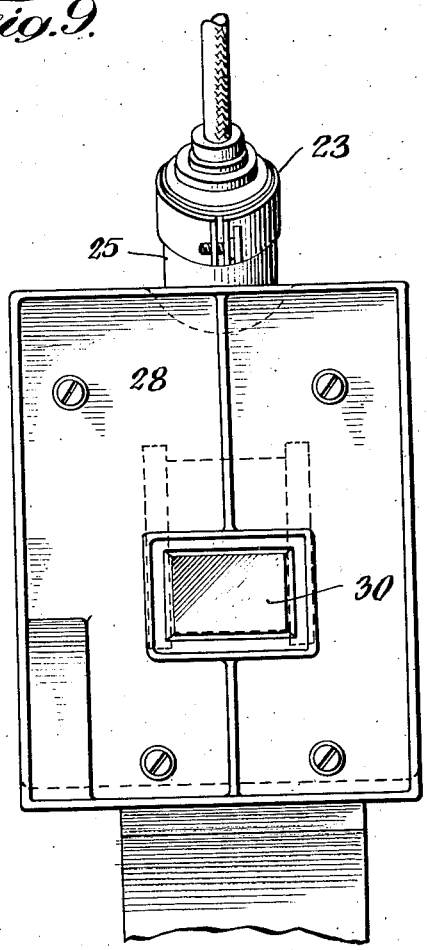
Fig. 9 is an elevation of the modified form shown in Fig. 8.
Figure 10:
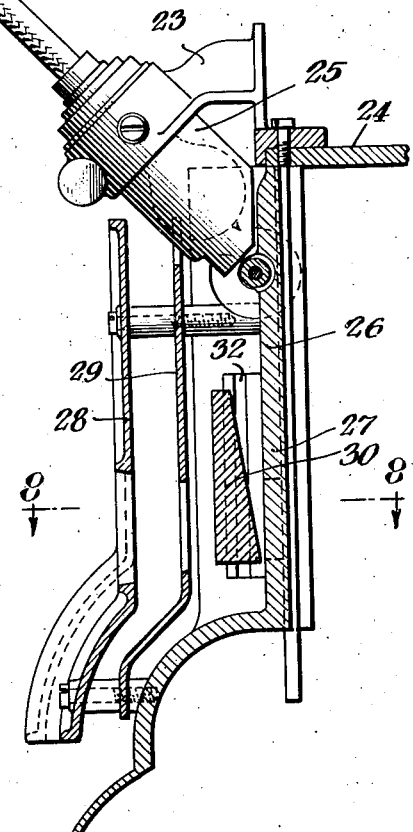
Fig. 10 is a partial vertical section through the form of the invention shown in Fig. 8.

In Figs. 8, 9, and 10 I have illustrated a further modification of the invention in which the low intensity lamp is supported from a bracket plate 23 from the permanent wall 24 of the machine and at the top thereof with the lamp casing 25 inclined downwardly and open at the bottom to permit the light to project down along the plate 26 in which the aperture opening 27 is disposed. Plates 28 and 29, each provided with openings in line with the aperture opening 27, are employed to assist in dispensing some of the heat created by the projection light. Between the plate 29 and the aperture plate 26 and in line with the aperture opening is disposed the fire shutter 30 which has a tapered or sloping surface that receives the light from the lamp above it and reflects it in such a manner that it is thrown forward upon the film to illuminate it for the purposes previously explained.

The shutter 30 is slidably mounted in guide slots 31 and 32 formed in the aperture plate 26 and on which film shoes 33 and 34 are mounted.

It will be seen from the foregoing illustrations that I have provided a suitable lighting means in association with a fire shutter of a motion picture projection machine in such manner that the operation of framing or properly positioning the film in the machine may be quickly and easily accomplished without the movement of the fire shutter, thus eliminating a fire hazard. Believing that I am the first in the field to accomplish such advantageous results, I desire to be understood that it is within the scope of my invention to place any lighting means to be associated with and arranged to cooperate with the fire shutter to give sufficient illumination of the film 4 so that the framing operation may be properly and accurately accomplished. Thus it will be seen that the fire shutter and the lighting means operate to cast a light on to the film for accomplishing the desired purposes.

It will be understood that while I have herein described in detail a particular embodiment of my invention for purposes of full disclosure and some detailed features which I am specifically claiming for a special advantage, many changes and modifications may be made in the particular construction and arrangement of parts without departing from the broad scope of the invention.

This application is related to my co-pending application Serial Number 12,485, filed March 2, 1925, which was issued as Patent No. 1,718,540 dated June 25, 1929 entitled "Framing light for motion picture projection machines". Patentable subject matter disclosed but not claimed in the present application is claimed in the above mentioned patent.

What I claim, is:

1. In a motion picture projection machine having a projection aperture therein, the combination of a fire shutter adapted to close said aperture when said machine is not operating, said shutter being provided with a light reflecting surface on its inner side for reflecting light to illuminate said projection aperture, and a source of light projected on to said reflecting surface.

2. In a motion picture projection machine having a projection aperture therein, the combination of a fire shutter adapted to close said aperture when said machine is not operating, said shutter being provided with a light reflecting surface on its inner side for reflecting light to illuminate said projection aperture, and a lamp of low intensity positioned to illuminate the reflecting surface on said shutter when said shutter is in its closed or down position.

3. In a motion picture projection machine which is provided with a projection aperture, a film positioned in said machine and arranged to pass said aperture, a fire shutter adapted to close said aperture to protect said film when the machine is not running, said shutter being provided with a bevelled surface on the side thereof adjacent the film, and a lighting means associated with said shutter and cooperating with said bevelled surface for illuminating the top and bottom edges of said aperture to permit the framing of said film in said machine.

4. In a motion picture projection machine which is provided with a projection aperture, a film positioned in said machine and arranged to pass said aperture, a fire shutter adapted to close said aperture to protect said film when the machine is not running, said shutter being provided with a bevelled surface on the side of said shutter adjacent said film, and an electric light of low intensity positioned to throw light on to said bevelled surface to thereby have said light reflected on to said film through said aperture whereby said film may be brought into proper registry with said aperture.

5. In a motion picture projection machine having a projection aperture therein, the combination of a fire shutter adapted to close said aperture when said machine is not operating, said shutter being provided with a light reflecting sloping surface, and lighting means disposed out of the line of the aperture and arranged to throw light on said surface.

6. In a motion picture projection machine having a projection aperture therein, the combination of a fire shutter adapted to close said aperture when the machine is not operating, said shutter being provided with a sloping reflecting surface, a low intensity lamp disposed above said shutter and adapted to throw light on to said sloping surface to be thereby reflected on to the film in front of the aperture opening.

7. In a motion picture projection machine having a projection aperture therein, the combination of a fire shutter formed with spaced light intercepting walls disposed between the aperture and the projection light, and a reflecting means associated with the side of said shutter toward the film, and lighting means out of the line of the aperture to throw light on said reflecting means to illuminate the film at the aperture opening.

8. In a motion picture projection machine having a projection aperture therein, a source of projection light, a film, a fire shutter having a light-reflecting surface sloping upward from the bottom of said shutter and backward from said projection aperture, and an auxiliary light disposed out of the line of the aperture and adapted to throw light on to the shutter.

9. In a motion picture projection machine having a projection aperture therein, a source of projection light, a film, a fire shutter disposed between the light source and the film, said fire shutter having a sloping surface disposed nearest the projection aperture, an auxiliary light disposed above the shutter and adapted to throw light on said surface, said auxiliary light being mounted stationary on the frame of said machine and permitting said shutter to move upward from its normal down position without striking said auxiliary light.

10. In a motion picture projection machine having a projection aperture therein, a fire shutter mounted to move between the source of projection light and the film, said shutter being of prismatic form with its thicker portion at the bottom thereof, and its sloping surface disposed toward the aperture, and an auxiliary light above the sloping surface out of the line of the aperture and adapted to throw light on to said surface.

11. In a motion picture projection machine having a projection aperture therein, a source of projection light, a film, a fire shutter disposed between the light source and the film, said fire shutter having a sloping surface disposed nearest the projection aperture, an auxiliary light disposed above the shutter and adapted to throw light on said surface, said auxiliary light being mounted stationary on the frame of said machine and permitting said shutter to move upward from its normal down position without striking said auxiliary light, a guard casing on said auxiliary light, the guard casing being provided with light openings at its bottom to send the light rays of low intensity to said reflecting surface and from there to the film for purposes of framing the film.

AUGUSTO DINA.